United States Patent

[11] 3,633,092

[72] Inventors Salvatore J. Grillo
Willow Grove;
Cary L. Townsend, Langhorne, both of Pa.
[21] Appl. No. 59,384
[22] Filed July 30, 1970
[45] Patented Jan. 4, 1972
[73] Assignee The United States of America as represented by the Secretary of the Navy

[54] PULSED POWER SUPPLY
5 Claims, 2 Drawing Figs.
[52] U.S. Cl.................................................. 321/27 R,
321/45 R, 325/169, 325/185, 330/30 R, 330/124
R, 330/197
[51] Int. Cl........................................................ H02m 7/52,
H04b 1/04, H03d 1/02
[50] Field of Search............................................ 321/2, 8,
14, 27, 45; 331/113.1; 325/169, 185, 186; 330/30
R, 124 R, 195, 197

[56] References Cited
UNITED STATES PATENTS
3,160,829 12/1964 Mahland ...................... 321/2 X
FOREIGN PATENTS
143,114 1962 U.S.S.R. ....................... 321/18

Primary Examiner—William H. Beha, Jr.
Attorneys—R. S. Sciascia and Henry Hansen

ABSTRACT: A step-up power supply is provided by a plurality of transistors arranged to drive respective, equal turn primary windings of a transformer. The transistor bases receive a common energizing pulse and the emitters are connected to a common source of positive voltage. Each collector is connected to ground via a single respective winding so that the voltage in each conduction path is shared by only one transistor and winding, thus maximizing the total voltage applied to the transformer. The power supply amplifies pulses from a blocking oscillator to drive a tuned-plate, tuned-grid transmitter.

PATENTED JAN 4 1972 3,633,092

INVENTORS
SALVATORE J. GRILLO
CARY L. TOWNSEND

BY
ATTORNEY

PULSED POWER SUPPLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention pertains generally to the field of power supplies and pulse amplifier circuits an more particularly to solid-state, reiterative circuits used as high-voltage supplies for transmitters and similar devices.

In the past, transistorized voltage converters with transformer output have been used to convert low-voltage DC pulses to a higher voltage. In many applications the output voltage required is extremely high in relation to the nominal battery voltage input to the voltage converter. This is especially true, for instance, in miniaturized meteorological equipment where a self-contained, pulsed power supply powered by a low-voltage battery is used to drive a transmitter requiring high plate voltage for efficient operation. One of the major tasks of a voltage converter is to place as much voltage as possible on the primary windings of the transformer. Accordingly, there must be a very low voltage drop across other elements in series with the windings. Transistors in the saturated condition customarily exhibit a residual resistance in the emitter-collector conduction path. Thus if several transistors are connected in series with a single primary winding, the total voltage will be shared by the transistors as well as the induction coil. Increasing the turns ratio of the transformer does not remedy this situation. Using a plurality of primary windings ordinarily introduces phase difficulties which must be counteracted by additional circuitry.

SUMMARY OF THE INVENTION

Accordingly one of the objects of the invention is to increase the output voltage of the transistorized power supply. Another object of the invention is to minimize the number of elements required to increase the effective voltage applied to the primary circuit of a transformer. A further object of the invention is to convert a low-voltage pulse to a high-voltage pulse by generating directly additive magnetic flux in a plurality of primary windings.

These and other objects are achieved by providing a plurality of transistors driving respective equal turn primary windings of a transformer. Each transistor has its base connected to receive a common energizing pulse. Each emitter is connected to a low-voltage DC source and each collector is connected to ground via a single separate equal turn primary winding so that the voltage on each winding is shared only by a single series transistor. The resulting power supply amplifies pulses from a blocking oscillator to power a tuned-plate, tuned-grid transmitter.

DESCRIPTION OF THE PREFERRED EMBODIMENT

Figure 1:
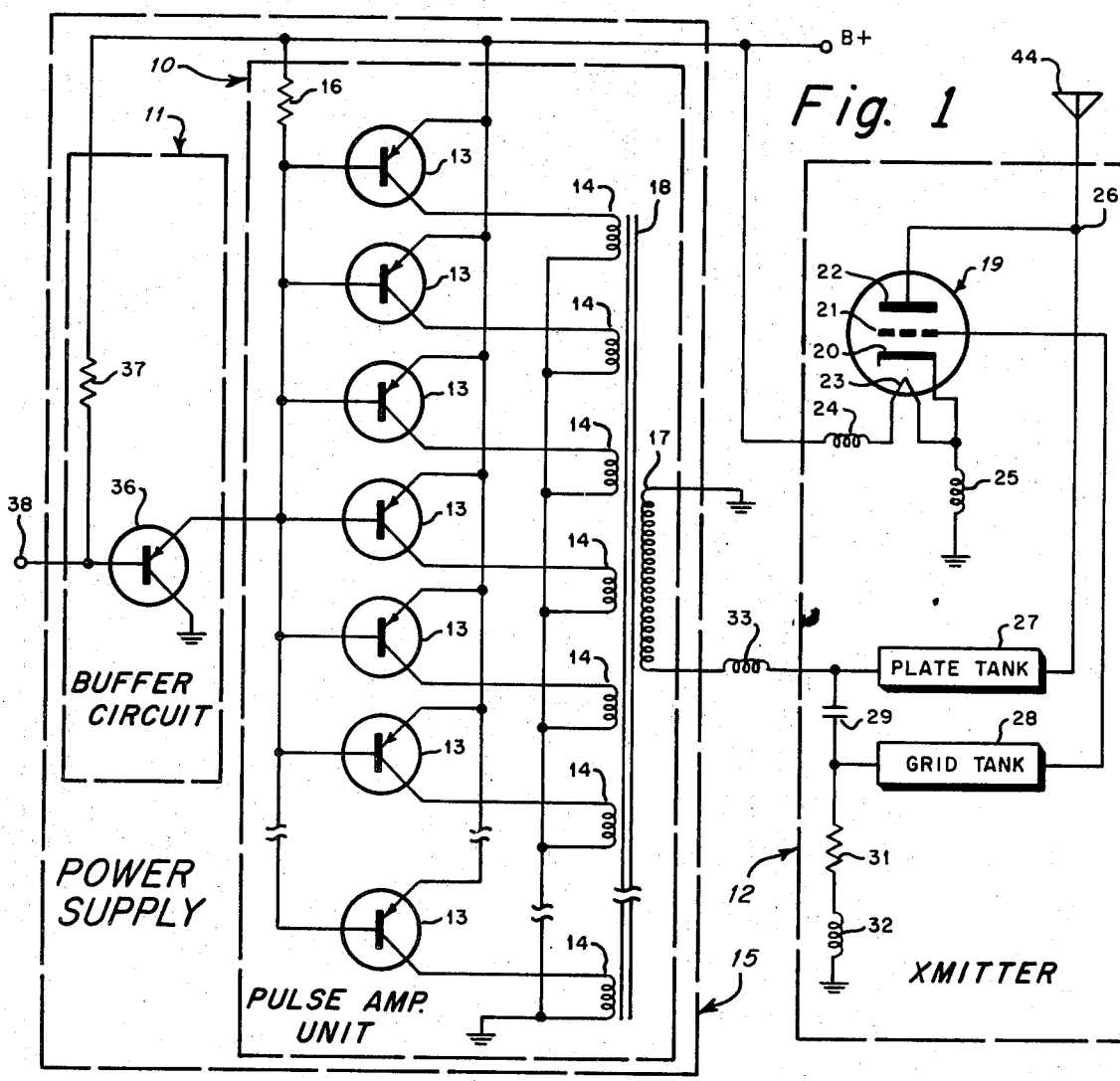
FIG. 1 is a schematic diagram of a power supply and transmitter circuit according to the invention.

Referring now to FIG. 1 a power supply 15 is depicted comprising a pulse amplifier unit 10 and a buffer circuit 11 arranged to drive a transmitter 12. Unit 10, circuit 11 and transmitter 12 each have a positive source of low voltage B+, such as the positive terminal of a battery. Ground connections throughout the following circuit description may thus be understood to correspond to the negative terminal of such battery. Amplifier unit 10 comprises a plurality of transistors 13 arranged to drive a respective plurality of equal turn primary windings 14. The base connection of each transistor 13 is connected in parallel to voltage source B+ through a resistor 16. The emitters are all directly connected to source B+. The collector of each transistor 13 is connected through its respective winding 14 to ground. The output of unit 10 is taken from a secondary winding 17 one end of which is grounded. Primary windings 14 and secondary winding 17 are wound on a single common core 18 to form a transformer. To insure equal turns and distribution among the primary windings, a single bundle of multiple, insulated strands corresponding to each primary winding is used.

Unit 10, while capable of driving any suitable, relatively high voltage load, is depicted in connection with transmitter 12 of the tuned-grid, tuned-plate type. Transmitter 12 comprises an electron tube 19 having a cathode 20, a grid 21, a plate 22 and a heating element 23. One side of heating element 23 is connected through a choke coil 24 to voltage source B+. The other side of element 23 along with cathode 20 is connected through another choke coil 25 to ground. Coils 24 and 25 may be a single bifillar wound RF choke. Plate 22 is connected via junction 26 to a plate tank circuit 27 having induction means. Grid 21 is connected through a grid tank circuit 28, also having inductance, to one side of a tuning capacitor 29. The one side of capacitor 29 is also connected to ground through a grid leak resistor 31 and an RF choke coil 32 connected in series. The other side of capacitor 29 is connected through an RF choke coil 33 to receive the output of amplifier unit 10 from the positive, ungrounded side of secondary winding 17. A transmitter antenna 44 is connected to plate 22 at junction 26.

To protect the input to amplifier unit 10 from the base currents in transistors 13, buffer circuit 11 is provided comprising a single transistor 36 having a grounded collector. The emitter of transistor 36 is connected directly to the junction of the parallel bases of transistors 13. A bias resistor 37 connects the base of transistor 36 with the voltage supply B+. The base of transistor 36 also serves as the input to power supply 15 at terminal 38.

Figure 2:
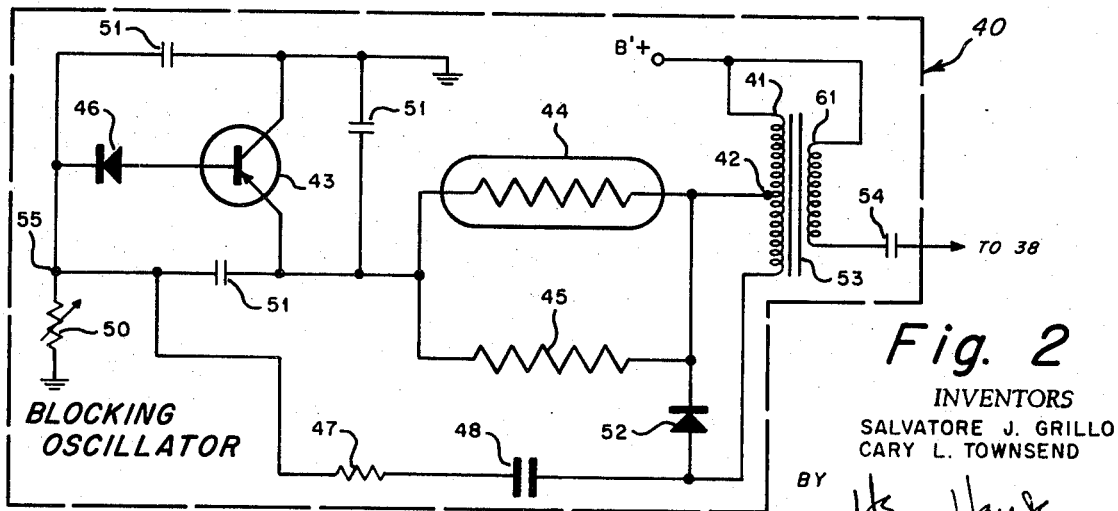
FIG. 2 is a schematic diagram of a blocking oscillator providing an input to the power supply of FIG. 1.

The input signal to buffer circuit 11 is normally a pulse of negative voltage from a signal generator such as a free-running multivibrator, blocking oscillator or any other suitable square wave or pulse generator. In FIG. 2 a preferred form of blocking oscillator 40 is depicted providing input pulses to buffer circuit 11. An induction coil 41 having an intermediate tap 42 is connected at one end to a low-voltage DC supply B'+, which may in practice be the same battery terminal as that used for B+ in FIG. 1. Tap 42 is connected to the emitter of a transistor 43 through a thermistor 44 which compensates for the effect of temperature variation on transistor 43. A resistor 45 is added in parallel to thermistor 44 to protect the circuit in the event that the thermistor 44 burns out. Transistor 43 has a grounded collector and a base connected to the other end of coil 41 through a reverse-biased diode 46, a decoupling resistor 47 and a capacitor 48 in series with each other. A grounded variable resistance 50 is connected to the junction 55 of diode 46 and resistor 47. Capacitor 218 and discharge resistor 50, ordinarily much larger than resistor 47, function as an RC circuit determining the pulse repetition frequency of the output of oscillator 40. The line connecting the base of transistor 43 with coil 41 through capacitor 48 forms a feedback path. RF bypass capacitors 51 having low capacitance are placed between the collector and emitter, emitter and junction 55 and between the collector and diode 46. Another diode 52 is connected between the other end of coil 41 and the junction of resistor 45 and tap 42 to form an oscillation damping circuit to cut off oscillations at the end of each output pulse.

In order to couple blocking oscillator 40 with buffer circuit 11 (FIG. 1), a secondary winding 61 having one end connected to positive source B'+ is disposed on a transformer core 53 in common with primary winding 41. The other end of secondary coil 61 is connected through blocking capacitor 54 to input terminal 38 of FIG. 1.

The output of blocking oscillator 40 may carry information contained in the variable pulse repetition frequency controlled by varying resistance 50 which changes the RC constant. Resistor 50, for example, may comprise a weather-sensitive element such as a temperature-, humidity- or pressure-responsive resistor.

In operation, transistor 36 in buffer circuit 11 of FIG. 1 is reverse-biased by base bias resistor 37 connected to source B+. The appearance of a negative voltage pulse at input terminal 38 causes the base of transistor 36 to become forward biased with respect to the emitter, and conduction between the emitter and collector occurs. When transistor 36 is in the nonconducting mode, the plurality of transistors 13 is cut off due to reverse-bias resistor 16 connected to each base. When transistor 36 conducts, the bases of transistors 13 go negative driving each transistor 13 into saturation and causing conduction between each emitter and collector. Thus a plurality of current paths is established, each having a single transistor 13 and a single coil 14 in series with each other. Since primary windings 14 share a common core 18 and are of equal turns, uniformly distributed, their magnetizing flux changes add collectively, resulting in a high voltage output in the single secondary winding 17.

Electron tube 19 in tuned-plate, tuned-grid transmitter 12 normally is in the nonconducting state. When voltage is induced in secondary winding 17 however a high positive voltage is placed on plate 22 causing conduction and oscillation at the RF frequency determined by tuning capacitor 29. The transmitted output through antenna 34 consists of bursts of RF energy switched on and off in accordance with the voltage on plate 22. The transmitted information is contained not in the amplitude of the RF but in the repetition frequency of the RF bursts.

Referring to blocking oscillator 40 (FIG. 2), current rises rapidly in the base of transistor 43 due to the forward bias between base and emitter. Current flow in the collector circuit increases accordingly inducing a negative-going voltage in transformer winding 41. This voltage charges capacitor 48, above its normal charge, increasing the forward bias on transistor 43. At saturation, the collector current becomes constant removing the charging potential so that capacitor 48 is free to discharge through variable resistor 50. Meanwhile the base is driven slightly positive by collapse of the field in coil 41, thus cutting off transistor 43 until discharging capacitor 48 reaches the point where the base is again forward biased, and the cycle repeats. Diode 52 prevents bidirectional oscillation immediately following each pulse. The signal on the primary winding 41 will consist of negative voltage pulses at a repetition frequency established by the value of variable resistance 50, which controls the length of time between pulses.

A similar negative voltage pulse will be induced in secondary winding 61 in accordance with the pulses on winding 41. Considering blocking oscillator 40 as the input to buffer circuit 11, transistor 36 is forced to conduct whenever pulses occur across output winding 61. As a result, transmitter 12 will be switched on and off at the pulse repetition frequency of oscillator 40.

Many equivalent, alternative arrangements for power supply 15 are possible. For instance, transistors 13 may be a single integrated circuit block with common base and emitter leads and separate collector connections or with common base and collector leads and separate emitter connections. Transistors 13 may comprise small, low-cost, general purpose transistors. Although electrically insulated from each other, they may share the same heat sink. The limiting factor on the number of transistors will ordinarily be determined by the capabilities of the heat sink employed. A typical number of transistors and associated windings would be around twelve when used with 6-volt battery and output voltage of about 500 volts.

Power supply 15 is equally useful with other compatible loads and inputs besides transmitter 12 and oscillator 40. In addition, the polarity of elements and voltages used throughout FIG. 1 and FIG. 2 are intended to be representative. Those skilled in the art will recognize that other equivalent orientations are permissible.

One important advantage of the arrangement of transistors in amplifier 10 is linked to the typical collector-emitter voltage characteristics for any transistor switching device. It is well known in the art that the collector-emitter voltage increases rapidly as the collector current passes saturation. Paralleling transistors on a common winding or increasing the transformer turns ratio does not remedy this current-limiting condition. The invention allows an increase in the current flowing in the primary winding of a transformer without changing the turns ratio of the transformer or decreasing the collector-emitter voltage as more transistors are added.

The reiterative construction of the amplifier unit 10 facilitates manufacture as well as circuit design. Once the parameters for the individual stage, that is, the combination of one transistor 13 with one coil 14, are optimized, additional stages with identical parameters may be added in the primary circuit until the output circuit load requirements are met.

Another advantage of power supply 15 is its ability to provide a relatively high voltage output from a very low voltage source without complex circuitry. No phase compensation is required in pulse amplifier unit 10. In applications where the total equipment weight is severely restricted, unit 10 is of great advantage. For example, rocketsondes, useful in gathering weather data over large altitude ranges, have been limited in the past as to their available transmitting power. The larger batteries needed to supply the voltage converter were too heavy and expensive for the expendable rocket loads which are customarily used. The present invention allows more powerful transmitters to be used in the rocketsondes, considerably extending their useful range. The cost and weight of adding more transistors in the primary circuit is far lower than that of higher voltage batteries.

It will be understood that various changes in the details, materials, steps and arrangements to parts, which have been herein described and illustrated in order to explain the nature of the invention, may be made by those skilled in the art within the principle and scope of the invention as expressed in the appended claims.

What is claimed is:

1. An amplifier unit for a pulse input signal, comprising:
   a DC voltage source;
   a plurality of semiconductor devices, each having a base electrode and first and second electrodes, each said first electrode connected in common to said DC voltage source, and each of said base electrodes connected directly in common and adapted to receive the input signal;
   bias means connected between said DC voltage source and said each of said base electrodes; and
   a transformer having a core, a secondary winding for output and a plurality of separate primary windings, each said primary winding being connected at one end thereof to the second electrode of a respective one of said devices and to ground or the other end thereof.

2. A power supply according to claim 1 wherein:
   said devices are transistors, and said first and second electrodes are emitters and collectors respectively.

3. A power supply according to claim 1 further comprising:
   buffer means having an output connected to said base electrode input terminal and having an input terminal adapted to be connected to an input circuit for isolating the input circuit from base currents flowing in said base electrodes.

4. A power supply according to claim 1 further comprising:
   buffer means having an output connected to said base electrode input terminal and having an input terminal for receiving the input signal.

5. A power supply according to claim 1 wherein:

said voltage is DC and has first and second terminals, each said first electrode and each said base electrode being operatively connected to the first terminal of said voltage source, each said primary winding being operatively connected to the second terminal of said voltage source to form a plurality of electrical circuits each comprising a single transistor and a single primary winding.

* * * * *

UNITED STATES PATENT OFFICE
CERTIFICATE OF CORRECTION

Patent No. 3,633,092            Dated January 4, 1972

Inventor(s) Salvatore J. Grillo et al.

It is certified that error appears in the above-identified patent and that said Letters Patent are hereby corrected as shown below:

On the cover sheet the illustrative drawing should appear as shown below:

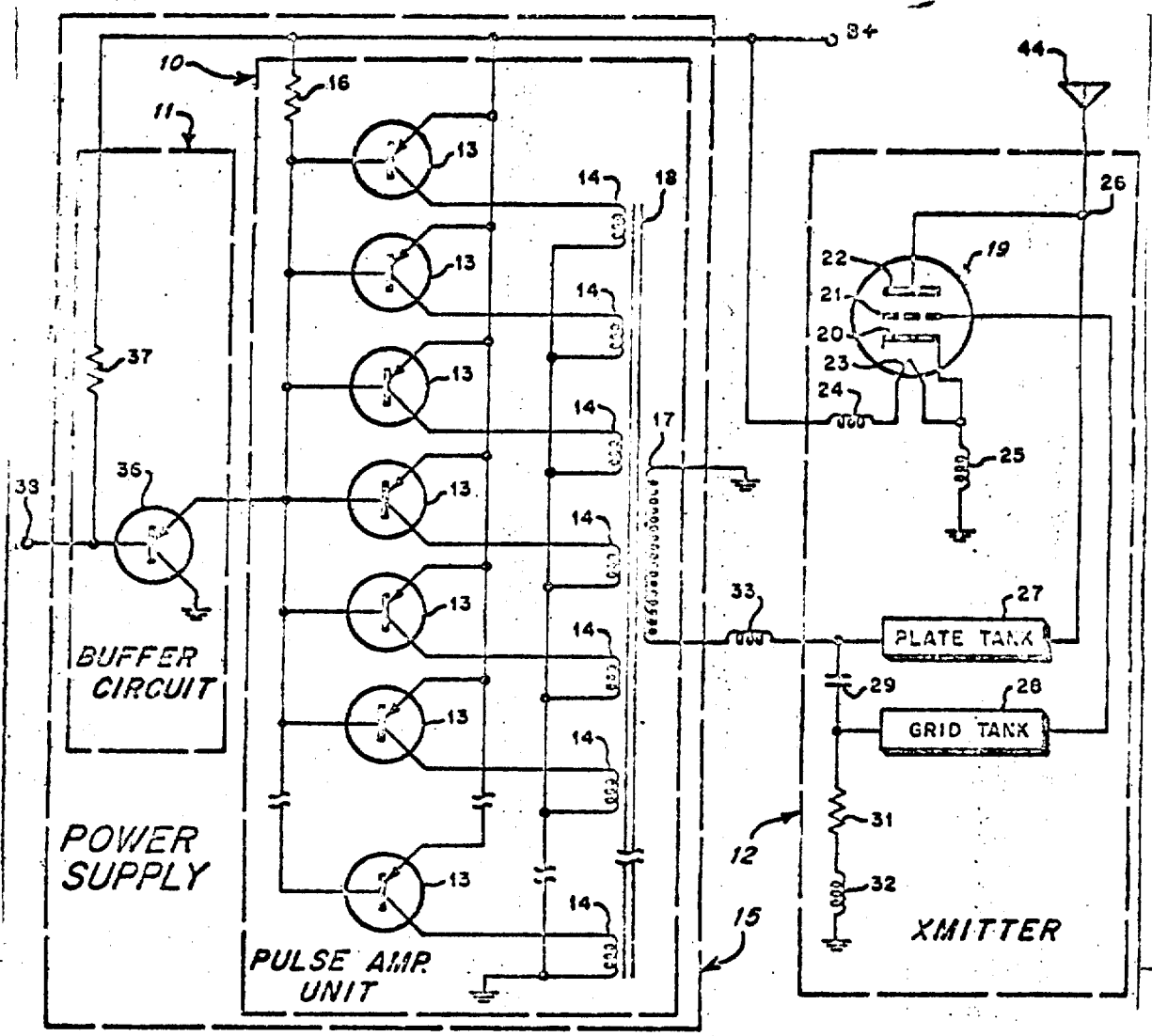

Signed and sealed this 8th day of August 1972.

(SEAL)
Attest:

EDWARD M. FLETCHER, JR.
Attesting Officer

ROBERT GOTTSCHALK
Commissioner of Patents